May 15, 1923.
F. W. PORTASS
CINEMATOGRAPH APPARATUS
Filed Jan. 6, 1920
1,455,766
2 Sheets-Sheet 2
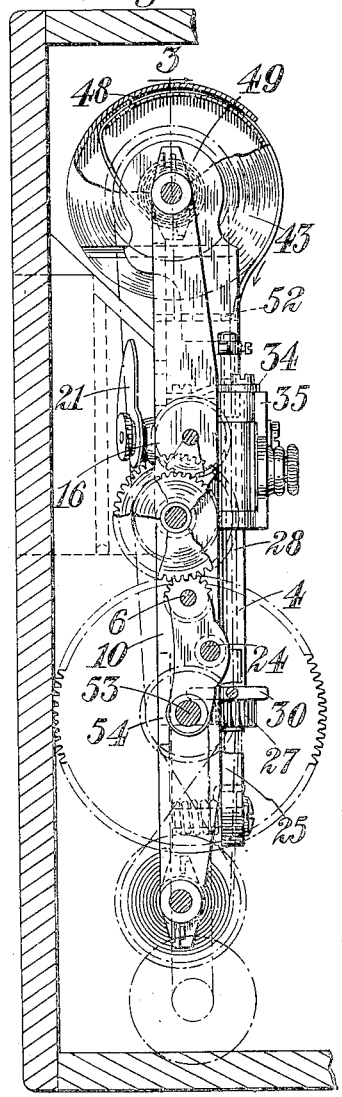
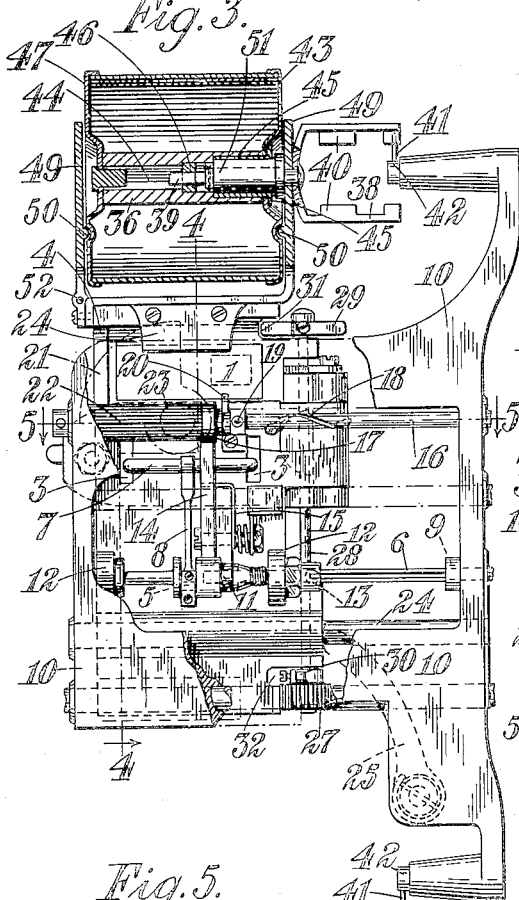
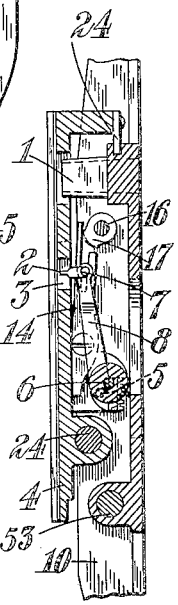
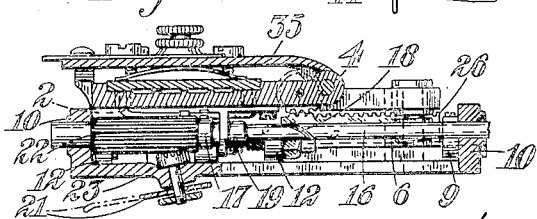
Inventor.
F. W. Portass,
By Foster, Freeman, Watson & Coit,
Attorneys.

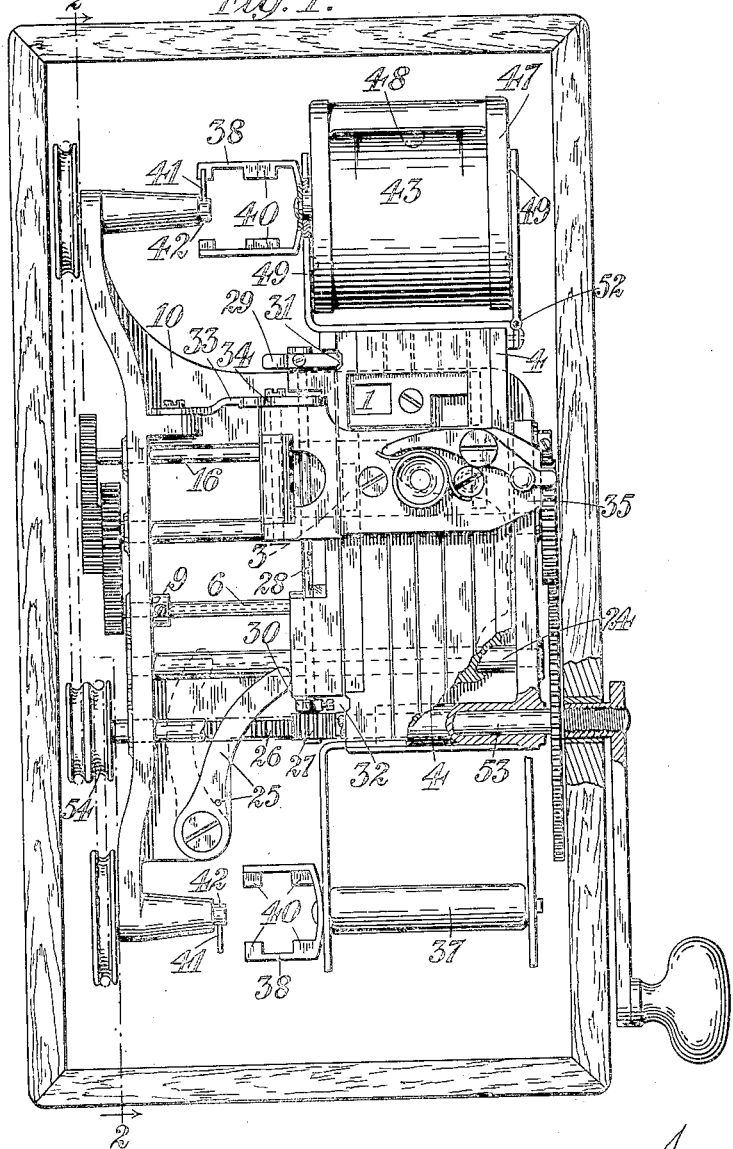

Patented May 15, 1923.

1,455,766

UNITED STATES PATENT OFFICE.

FREDERICK WILLIAM PORTASS, OF SHEFFIELD, ENGLAND, ASSIGNOR OF ONE-THIRD TO CHARLES PORTASS AND ONE-THIRD TO STANLEY MOORE PORTASS, BOTH OF SHEFFIELD, ENGLAND.

CINEMATOGRAPH APPARATUS.

Application filed January 6, 1920. Serial No. 349,701.

*To all whom it may concern:*

Be it known that I, FREDERICK WILLIAM PORTASS, subject of the King of England, residing at Sheffield, in England, have invented certain new and useful Improvements in or Relating to Cinematograph Apparatus, of which the following is a specification.

This invention relates to cinematograph apparatus, whether used for taking or for exhibiting moving pictures, of the type in which there are two or more series of pictures upon the film the direction of travel of the film in the apparatus being reversed and the film being moved laterally at the end of each series of pictures, the object of the invention being to provide improvements in the construction and operation of the means for reversing the direction of feed of the film at each step of its lateral movement, for effecting and controlling such lateral movement, for taking up the slack film fed at each step and, when the apparatus is used in a camera, for enclosing the film in a light-proof spool box.

The film is fed longitudinally on a laterally movable film carrier by reciprocating claws protruded through slots in the film carrier by cam action and according to the present invention the claws are reciprocated and the cam rotated by separate continuously rotating shafts, whilst the direction of film feed is reversed by the lateral movement of the film carrier operating means for altering the time of cam operation in relation to the period of claw reciprocation. The extent of this alteration in timing is of course dependent upon the relative speeds of the two shafts referred to, and is such that the claws are protruded through the film carrier whilst moving in the opposite direction to that in which they were protruded at the preceding position of the film carrier.

The claws are reciprocated from a crank shaft, which is preferably driven at twice or a greater multiple of the speed of the cam shaft in order that the time during which the film is stationary may be longer than that in which it is being moved.

The alteration of the time of cam operation in relation to the period of claw reciprocation may be effected by moving the cam along, and rotating it in relation to, its shaft through an angle which bears the same proportion to 180° as the speed of the cam shaft does to that of the crank shaft, one method of effecting this being by means of a helical groove in the cam shaft, which is mounted on the main frame of the apparatus, a key on the cam engaging that groove and a shoe or the like on the film carrier engaging a circular part of the cam.

The shutter is rotated from and at the same speed as the cam shaft, preferably from a pinion which is rotated in relation to the cam shaft to the same extent as is the cam when reversing the direction of film feed, in order that the dimensions of the shutter may be such that it only operates during the time that the film is actually moving.

The film carrier is movable laterally on a suitable frame by spring action and the film itself is employed to limit the amount of lateral movement of the carrier, in addition to governing the point at which that lateral movement takes place. A portion of one edge is removed from the film adjacent to one end, the spring controlled laterally movable film carrier is notched at one side into the path of the film, a pinion is mounted thereon gearing with a relatively fixed rack and an arm is provided on the pinion spindle adapted to engage the film which overlaps the notch. Thus the film prevents rotation of the arm and of the pinion and so limits the lateral movement of the film carrier which its spring tends to impart to it. When the film is provided with more than two series of pictures a portion of its edge is removed from near each end, the film carrier is notched at two places and there are two arms at an angle to one another spaced apart on the length of the spindle and each adapted to engage the film overlapping one of the notches. Thus when the film allows one arm to pass through the corresponding notch in the carrier it will limit the lateral movement of the carrier by the contact of the other arm with the film overlapping the other notch. In order to regulate the amount of lateral movement of the film carrier each arm is preferably adjustable on its axis.

Bearings for a film bobbin are provided on the film carrier, preferably one set at each end, and a spindle rotated by the mechanism is provided on the main frame co-axial with such bearings, a clutch being also furnished capable of alternately connecting and disconnecting the spindle and film bobbin as the film carrier is moved laterally. This clutch comprises an arm on the spindle or bobbin axis and spaced projections cranked from the bobbin axis or spindle respectively which engage the arm or not according to the position of the film carried. Conveniently a spindle is mounted in one of the film bobbin bearings and carries one member of the clutch, the spindle extending through the bearings and being provided with means for obtaining a driving engagement with the film bobbin.

When the apparatus is used as a camera the film is enclosed in a light-proof cylindrical spool box provided with a circumferential annular passage for the film. One end of the spool box is furnished with a concentric inwardly projecting annular flange and the film bobbin is made with a concentric recess at one end to receive such annular flange, whilst a detachable lid is provided for the spool box having a bearing for the other end of the bobbin.

The spool box thus containing the film bobbin is mounted on the film carrier, with its annular flange surrounding the clutch spindle bearing.

The film carrier is preferably provided with a hinged cover and with a suitable projection forming a latch capable of engaging a spring catch on the main frame adapted to hold the film carrier against the action of its spring in the first position. The cover is suitably extended beyond its hinge with a cam surface adapted to release the spring catch when the cover is closed.

In the accompanying drawings:—

Figure 1 is a plan of a cinematograph apparatus according to the present invention with the lid of its box removed, the laterally movable film carrier being shown in the last of four successive positions.

Figure 2 is a sectional side elevation on the line 2—2 of Figure 1.

Figure 3 is an underside plan partly in section on the line 3 of Figure 2 and with a part of the main frame broken away.

Figure 4 is a sectional view on the line 4—4 of Figure 3 and Figure 5 is a sectional view on the line 5—5 of Fig. 3.

Like reference numerals indicate like parts throughout the drawings.

According to the present invention the winding mechanism is rotated continuously in the same sense, the film being moved longitudinally past the gate and lens 1 for the first series of pictures by means of reciprocating claws 2 (Figure 4) which are moved forward through slots 3 in the laterally movable gate frame or film carrier 4 to engage the holes at the edges of the film when moving in one direction and are withdrawn from engagement therewith during their return. These claws are reciprocated on the film carrier 4 by means of a crank 5 which is driven from a counter shaft 6 of the mechanism, the claws being preferably comprised by the ends of a fork 7 carried by a connecting rod 8 operated by the crank 5. The counter shaft 6 is held at its driven end by a collar 9 in a bearing on the main frame 10 and at its other end is supported in a hollow shaft 11 carrying the crank 5, the shaft 11 being mounted in suitable bearings 12 on the film carrier or gate frame 4. A set pin or the like 13 on the hollow crank shaft 11 engages a key-way in the counter shaft 6 and thus the drive of the crank shaft is not interrupted when the film carrier 4 is moved laterally on the frame 10 to change the series of pictures which is passing the lens. The fork 7 carrying the claws 2 is engaged by a movable slide 14 which is conveniently pivoted to a suitable part of the film carrier and spring controlled at 15 normally to hold the claws free of the holes at the edges of the film. A cam shaft 16 is provided, also continuously rotated in the same sense by the mechanism, and is furnished with a cam 17 so shaped and disposed as to move the spring-controlled slide 14 (or an extension of the fork 7 or connecting rod 8) to bring the claws 2 through the slots 3 in the film carrier or gate frame 4 to engage with the holes at the edges of the film at the desired part of the period of claw reciprocation, the disposition of the cam and the extent of its surface being such as to hold the claws in such position whilst they are moved in one direction. At or before the return movement of the claws the cam releases them and the slide 14, whose spring 15 then operates to disengage the claws from the film. Although the two shafts 6 and 16 are shown in the drawings as driven at the same speed it is preferred to arrange the gear wheels connecting them so that the crank shaft 6, 11 is driven at twice, three times or even a greater multiple of the speed of the cam shaft 16 so that the claws reciprocate through two or a greater number of complete periods for each step that the film is moved. Thus the time during which the film is stationary is longer than that in which it is being moved, in order to obtain a longer exposure of the film or projection of each picture.

At the end of the first series of pictures the film carrier 4 is moved laterally by means hereinafter described on the frame 10 to bring the second series opposite the lens and the direction of travel of the film is reversed by providing means for enabling such lateral movement of the film carrier to alter the time of cam operation in relation to the period of claw reciprocation. In the construction illustrated this is effected by relatively rotating the cam 17 in relation to its shaft 16 at each step of the transverse movement of the film carrier and by moving it longitudinally on its shaft with the film carrier. For this purpose a helical groove 18 is made in the cam shaft, the cam 17 is rotatably mounted on the shaft and a key 19 in the cam engages the helical groove, a shoe 20 or the like on the film carrier engaging a circular groove turned in a boss or collar of the cam. Thus when the film carrier is moved laterally the cam 17 is moved with it and is rotated in relation to its shaft 16 by the engagement of the key 19 with the helical groove 18. The amount of rotation of the cam on its shaft is such that in the new position it operates to move the claws 2 through the slots 3 whilst they are moving in the opposite direction to that in which they were previously driven whilst protruding through the slots and thus the direction of travel of the film is reversed. The claws 2 reverse their direction of travel at each 180° through which the crank shaft is turned, so that when the crank shaft is driven at twice the rate of the cam shaft it will be appreciated that the cam must be turned in relation to its shaft through an angle of 90° to effect a reversal of the direction of travel of the film. Similarly if the speed ratio of the crank shaft and cam shaft is greater than two to one the angle through which the cam 17 must be turned to effect reversal of the film travel is correspondingly reduced.

With this construction it will be appreciated that a single cam will operate the claws to reverse the direction of travel of the film as often as may be desired, the groove 18 extending along the shaft 16 for a distance equivalent to the lateral movement of the film carrier 4.

The shutter 21 is rotated at the same speed as the cam shaft 16 by gearing 22, 23 from that cam shaft 16 and it is preferred to rotate the pinion 22 relatively to its shaft to the same extent as the cam so that the dimensions of the shutter may be such that it operates only during the time that the film is actually moving. The pinion 22 is therefore either made integral with the cam 17 or otherwise connected therewith so that the two members are always moved together, both longitudinally and about their common axis. As the shutter 21 is carried by the frame 10 and does not partake of the lateral movement of the film carrier, the pinion 22 is made in the form of a drum as shown gearing with a crown wheel 23 operating the shutter 21, the axis of the crown wheel being somewhat inclined to that of the cam shaft. Thus when the apparatus is used as a camera, the shutter may be designed to exclude light only whilst the film is actually moving, and when so designed and adjusted for one position of the film carrier it will be equally operative in all positions thereof as it will always be passing across the lens whilst the cam 17 is protruding the claws 2 through the slots 3.

To provide for the lateral movement of the film carrier 4 it is mounted on suitable slides 24 on the frame 10 of the machine and is spring controlled as at 25.

A rack 26 is provided on the frame 10 gearing with a pinion 27 carried by a spindle 28 mounted on the film carrier longitudinally as regards the film so that when the film carrier is moved transversely by its spring this spindle is rotated. The spindle is provided with two arms 29 and 30 at an angle to one another, spaced an appreciable distance apart on the length of the spindle and moving on the rotation of the spindle partially across the path of the film, the film carrier being slotted or notched as at 31 and 32 into the path of the film to permit of the rotation of the arms. Normally the film itself covers or overlaps these notches and prevents rotation of one arm and consequently of the spindle, thereby locking the film carrier against transverse movement. Although the film carrier 4 is shown in the last of four successive positions, the arms 29 and 30 are illustrated in the positions they would occupy whilst the first series of pictures was passing the lens in the first position of the film carrier. A notch is formed in the edge of the film or a portion of its edge removed and when the end of the first series of pictures is reached this notch or narrow part of the film exposes the slot 31 or notch in the film carrier thereby allowing the arm 29 to pass through it and the spindle to rotate, whereupon the film carrier will be moved transversely under the action of its spring. When it has moved sufficiently to bring the second series of pictures opposite the lens and to reverse the movement of the film the other arm 30 on the spindle 28 comes into contact with the film and thus locks the film carrier in the second position. The longitudinal distance between the arms 29 and 30 must therefore be sufficient for the second arm to come into contact with the film before the notch or opening in the film has arrived at the notch in the film carrier where that second arm is situated. Similarly at the end of the second series of pictures the second arm 30 is allowed to pass through the slot 32 in the film carrier by means of a notch at the other end of the film, the first arm 29 then locking the film carrier in the third position. At the end of the third series the operation of the parts is similar to that at the end of the first. It will be appreciated that for the transverse movement of the film carrier to be equal at each reversal of the direction of travel of the film, the arms on the spindle are symmetrically disposed thereon, two double arms as illustrated being at an angle of 90° with each other, whilst two single arms would be at an angle of 180° and so on. These arms are preferably adjustable angularly on the spindle 28 so that the amount of lateral movement of the film carrier may be regulated to provide registration of the series of pictures with the lens.

When there are only two series of pictures on the film it will only be necessary to provide one arm on the spindle 28, the second and last step of the lateral movement of the film carrier being limited by a fixed, preferably adjustable stop.

A spring controlled catch 33 holding the film carrier in or beyond the first position by engagement with a latch or projection thereon is preferably provided for ease in threading the film, and may conveniently be released automatically by a cam surface 34 or the like on the hinged gate cover 35. This cam surface 34 extends at approximately right angles to the cover 35 and when the latter is closed depresses the catch to hold it free from the latch or projection on the film carrier. On opening the cover the cam part 34 moves away from the catch which is thus allowed to move to lock the film carrier in the first position when the cover 35 is open. On closing the cover the catch is released and the film carrier held by the arm 29.

The film is carried on a suitable bobbin 36 which is detachably mounted in bearings on the part of the apparatus hereinbefore referred to as the film carrier 4. Whilst exhibiting the first row of pictures the film may either pass into a box like receptacle or be positively wound on to a second bobbin 37 mounted on the other end of the film carrier. The bobbin from which at any time the film is unwound is operated only by the tension of the film caused by the claws 2 giving the latter its step by step movement. The bobbin upon which the film is being wound is rotated by the driving mechanism by any convenient clutch arrangement which can be thrown into or out of gear by the transverse movement of the film carrier. One convenient construction comprises a cranked arm or a fork 38 on a spindle 39 (Figure 3) extending from the centre of each bobbin and having inward spaced projections 40 capable of engaging an arm, cross bar or the like 41 on a spindle 42 coaxial with the bobbin axis and rotated by the driving mechanism, when the film carrier is in such a position that it is desired to drive the bobbin.

The spaced projections 40 on the two forks 38 are oppositely arranged; that is to say, where one fork is provided with a projection there is a space in the other in which the arm 41 is free to rotate. The distance between projections is such that at each lateral step of the film carrier 4 the arms 41 alternately engage a projection and are free of the fork 38. The parts are also so proportioned and disposed that when the film carrier is in the first position to take or to expose the first series of pictures the arm 41 at one end of the apparatus revolves in a space between the projections 40 and the cranked part of the fork on the bobbin 36 carrying the unexposed film, whilst the arm 41 at the other end of the apparatus engages one of the projections 40 of the adjacent fork to rotate the bobbin 37 to which it is connected. At each lateral step of the film carrier the relative positions of the two arms 41 with the projections 40 are reversed, the arm which was free engaging a projection and vice versa. The two spindles 42 are driven in the opposite senses, by crossing a driving band or by a suitably fitted reverse gear and thus the film fed from one bobbin will be positively wound on to the other one at each lateral step of the film carrier. If desired the fork or cranked arm may be rotated by the driving mechanism and the arm be carried on the bobbin spindle. The spindles 42 carrying the arms 41 are conveniently rotated by means of bands or the like and when a spool box is used preferably at a somewhat less angular speed than that at which a spool of about three quarters the diameter of the box would take up the movement of the film imparted by the claws, the function of the bobbin drive being mainly to take up the slack film and to prevent it from binding inside the spool box when the latter is used.

The holes at the edges of the film may be removed at one end from both sides thereof by suitably cutting the film in order to render the feed inoperative when the last series of pictures has passed the lens and thus to prevent the film from being disconnected from the bobbin by continued operation of the winding mechanism, especially in cases when a positive connection between film and bobbin is provided.

When the apparatus is used as a camera for taking moving pictures the unexposed film is preferably enclosed in a light-proof spool box 43 so that the camera may be loaded in daylight. The bobbin 36 carrying the film is conveniently furnished with a central hole 44 and an inwardly projecting annular flange 45 on one side of the spool box engages this hole or an enlargement thereof to form a light-proof joint. The spindle 39 operating the bobbin enters the bobbin hole 44 through the flange 45, suitable means being provided to prevent relative rotation between the spindle and bobbin, as for example, a square holed washer 46 fixed in the bobbin hole 44 engaging a squared part of the spindle 39. The other end of the bobbin is furnished with any suitable form of bearing on the other side of the spool box and this side 47 is preferably detachable forming a lid to enable the bobbin and film to be placed within the spool box. One end of the film is attached in any convenient manner to the bobbin, for example, by means of a hole in the film engaging a hook or the like on the bobbin. Its other end passes through a slot 48 in the cylindrical surface of the spool box, and to render this slot light-proof it is made in the form of an annular passage extending partially around the circumference of the spool box.

The spool box may be attached to the film carrier 4 in any convenient manner such as by arms 49 on the latter having inwardly projecting flanges 50 engaging slots or grooves in the sides of the spool box. Conveniently the spindle 39 with its clutch fork 38 is mounted in a bearing 51 on one of the arms 49 the projecting end of the spindle being squared to engage the washer in the bobbin hole 44. The arm 49 which embraces the other side of the spool box 43 is preferably hinged to the film carrier 4 as indicated at 52 to facilitate the insertion in place of the spool box.

After passing across the lens the film may be wound upon a bobbin or run free into a light-proof part of the camera or it may be wound inside another similarly constructed spool box and in the latter case the bobbins of the two spool boxes would preferably be alternately driven in the opposite senses by the clutch arrangement herein before described, a reverse gearing being fitted if desired on one of the spool boxes between the spindle and the bobbin instead of crossing one of the driving bands. A spool box, will not of course, be necessary when the apparatus is used to exhibit moving pictures.

As previously stated, apparatus according to this invention may be used either for taking or for exhibiting moving pictures. In the former case the emulsion side of the negative is arranged to face the lens. In the latter case, in order to obtain a correct representation of the scene, the emulsion side of the positive is arranged to be on the further side of the film as regards the lens. In order to effect this whilst still having the emulsion side of both negative and positive inside the roll of film it is necessary to reverse the sense of rotation of both the bobbins when changing the use of the apparatus from exposing to exhibiting and vice versa. For this purpose a reverse gear of any desired design may be fitted between the belt driving spindle 53 and the belt pulleys 54 thereon.

What I claim and desire to secure by Letters Patent is:—

1. In cinematograph apparatus the combination of a frame, a laterally movable film carrier mounted thereon, means for moving it laterally by intermittent steps, means for rotatably mounting a film on the carrier, claws slidably mounted on the carrier for feeding the film longitudinally, a crank shaft supported on the film carrier reciprocating the film-moving claws, a cam shaft on the main frame, a cam thereon operating to protrude the claws through slots in the film carrier during their travel in one direction, means for withdrawing the claws from the slots and means operated by the lateral movement of the film carrier for reversing the film feed by altering the time of cam operation in relation to the period of claw reciprocation, substantially as specified.

2. In cinematograph apparatus the combination of a frame, a laterally movable film carrier mounted thereon, means for moving it laterally by intermittent steps, means for rotatably mounting a film on the carrier, claws slidably mounted on the carrier for feeding the film longitudinally, a crank shaft supported on the film carrier reciprocating the film-moving claws, a cam shaft on the main frame, a cam thereon operating to protrude the claws through slots in the film carrier during their travel in one direction, means for withdrawing the claws from the slots, means operated by the lateral movement of the film carrier for reversing the film feed by altering the time of cam operation in relation to the period of claw reciprocation and means for driving the crank shaft at a multiple of the speed of the cam shaft substantially as and for the purpose specified.

3. In cinematograph apparatus the combination of a frame, a laterally movable film carrier mounted thereon, means for moving it laterally by intermittent steps, means for rotatably mounting a film on the carrier, claws slidably mounted on the carrier for feeding the film longitudinally, a crank shaft supported on the film carrier reciprocating the film-moving claws, a cam shaft on the main frame, a cam thereon operating to protrude the claws through slots in the film carrier during their travel in one direction, means for withdrawing the claws from the slots, and means for moving longitudinally and rotating the cam in relation to its shaft by the lateral movement of the film carrier through an angle which bears the same proportion to 180° as the speed of the cam shaft does to that of the crank shaft substantially as and for the purpose specified.

4. In cinematograph apparatus the combination of a frame, a laterally movable film carrier mounted thereon, means for moving it laterally by intermittent steps, means for rotatably mounting a film on the carrier, claws slidably mounted on the carrier for feeding the film longitudinally, a crank shaft supported on the film carrier reciprocating the film-moving claws, a cam shaft on the main frame, a cam thereon operating to protrude the claws through slots in the film carrier during their travel in one direction, means for withdrawing the claws from the slots, a helical groove in the cam shaft, a key on the cam engaging such groove and a projection on the film carrier engaging a circular part of the cam substantially as specified.

5. In cinematograph apparatus the combination of a frame, a laterally movable film carrier mounted thereon, means for moving it laterally by intermittent steps, means for rotatably mounting a film on the carrier, claws slidably mounted on the carrier for feeding the film longitudinally, a crank shaft supported on the film carrier reciprocating the film-moving claws, a cam shaft on the main frame, a cam thereon operating to protrude the claws through slots in the film carrier during their travel in one direction means for withdrawing the claws from the slots, means operated by the lateral movement of the film carrier for reversing the film feed by altering the time of cam operation in relation to the period of claw reciprocation, and a shutter rotated from and at the same speed as the cam shaft substantially as specified.

6. In cinematograph apparatus the combination of a frame, a laterally movable film carrier mounted thereon, means for moving it laterally by intermittent steps, means for rotatably mounting a film on the carrier, claws slidably mounted on the carrier for feeding the film longitudinally, a crank shaft supported on the film carrier reciprocating the film-moving claws, a cam shaft on the main frame, a cam thereon operating to protrude the claws through slots in the film carrier during their travel in one direction, means for withdrawing the claws from the slots, means for moving longitudinally and rotating the cam in relation to its shaft by the lateral movement of the film carrier through an angle which bears the same proportion to 180° as the speed of the cam shaft does to that of the crank shaft, an elongated pinion on the cam shaft movable thereon with the cam, a shutter spindle mounted on the main frame inclined to the axis of the cam shaft and a crown wheel on the shutter spindle gearing with the pinion substantially as and for the purpose specified.

7. In cinematograph apparatus the combination of a frame, a laterally movable film carrier thereon, a film having a gap in its edge adjacent to one end, means for feeding the film longitudinally on the carrier, means for reversing its feed, a spring tending to move the film carrier laterally and a stop member adapted to be moved across the film path by the lateral movement of the film carrier normally limiting such movement by contact with the film and permitting such movement by passing through the said gap, substantially as specified.

8. In cinematograph apparatus the combination of a frame, a laterally movable film carrier thereon, a film having a gap in its edge adjacent to each end, means for feeding the film longitudinally on the carrier, means for reversing its feed, a spring tending to move the film carrier laterally, a stop member adapted to be moved across the film path by the lateral movement of the film carrier normally limiting such movement by contact with the film and permitting such movement by passing through one of the said gaps, and a second stop member operating in like manner alternately with the first passing through the other of the said gaps to permit lateral movement of the film carrier, substantially as specified.

9. In cinematograph apparatus the combination of a frame, a film having a portion of one edge removed adjacent to one end, means for feeding the film longitudinally, means for reversing its feed, a spring controlled laterally movable film carrier notched through one side into the path of the film, a spindle mounted thereon, a pinion keyed to the spindle and gearing with a rack on the frame and an arm on the pinion spindle adapted to engage the film overlapping the notch substantially as and for the purpose specified.

10. In cinematograph apparatus the combination of a frame, a film having a portion of one edge removed adjacent to each end, means for feeding the film longitudinally means for reversing its feed, a spring controlled laterally movable film carrier notched at two places through one side into the path of the film, a spindle mounted thereon a pinion keyed to the spindle and gearing with a rack on the main frame, and two arms at an angle to one another on the pinion spindle each adapted to engage the film overlapping one of the notches, substantially as and for the purpose specified.

11. In cinematograph apparatus the combination of a frame, a laterally movable film carrier mounted thereon, means for moving it laterally by intermittent steps, a film bobbin supported in bearings on the film carrier, means for feeding the film longitudinally, means for reversing its feed, a spindle on the main frame co-axial with the bobbin bearings, means for driving the spindle, and a clutch between the spindle and bobbin comprising an arm on one clutch member and spaced projections on the other clutch member cranked from the axis which alternately engage and disengage the arm during the lateral movement of the film carrier substantially as and for the purpose specified.

12. In cinematograph apparatus the combination of a frame, a laterally movable film carrier mounted thereon, means for moving it laterally by intermittent steps, a film bobbin supported in bearings on each end of the film carrier, means for feeding the film longitudinally, means for reversing its feed, a spindle of the main frame coaxial with each bobbin bearings, means for driving the spindles and a clutch between each spindle and bobbin each clutch comprising an arm on one clutch member and spaced projections on the other clutch member cranked from the axis which alternately engage and disengage the arm during the lateral movement of the film carrier, the spaced projections on the two clutches being oppositely arranged substantially as and for the purpose specified.

13. In cinematograph apparatus the combination of a frame, a laterally movable film carrier mounted thereon, means for moving it laterally by intermittent steps, a film bobbin supported in bearings on the film carrier, means for feeding the film longitudinally, means for reversing its feed, a spindle on the main frame co-axial with such bearings, means for driving the spindle, a clutch alternately connecting and disconnecting the spindle and film bobbin as the film carrier is moved laterally, a spindle mounted in one of the film bobbin bearings and carrying one member of the clutch and means for enabling that spindle to have a driving engagement with the film bobbin substantially as and for the purpose specified.

14. In cinematograph apparatus the combination of a frame, a laterally movable film carrier mounted thereon, means for moving it laterally by intermittent steps, means for rotatably mounting a film on the carrier, means for feeding the film longitudinally, means for reversing its feed, a hinged cover on the film carrier for the film, a spring catch capable of locking the film carrier and a cam surface on the cover releasing the catch when the cover is closed substantially as specified.

In testimony whereof I have affixed my signature in presence of two witnesses.

FREDERICK WILLIAM PORTASS.

Witnesses:
 ARTHUR H. GREENWOOD,
 FLORENCE MAY.